United States Patent
Yamahira et al.

(10) Patent No.: US 9,045,007 B2
(45) Date of Patent: Jun. 2, 2015

(54) HEAVY-LOAD RADIAL TIRE

(75) Inventors: Atsushi Yamahira, Hyogo (JP); Reika Noguchi, Hyogo (JP); Kenichiro Tanada, Hyogo (JP); Masahiro Tamura, Hyogo (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 423 days.

(21) Appl. No.: 13/164,529

(22) Filed: Jun. 20, 2011

(65) Prior Publication Data

US 2011/0315288 A1    Dec. 29, 2011

(30) Foreign Application Priority Data

Jun. 24, 2010    (JP) .................................. 2010-144029

(51) Int. Cl.
| | |
|---|---|
| *B60C 11/00* | (2006.01) |
| *B60C 11/01* | (2006.01) |
| *B60C 11/04* | (2006.01) |
| *B60C 11/12* | (2006.01) |

(52) U.S. Cl.
CPC .............. *B60C 11/0083* (2013.04); *B60C 11/01* (2013.01); *B60C 11/04* (2013.01); *B60C 11/12* (2013.01); *B60C 2011/013* (2013.04)

(58) Field of Classification Search
CPC .... B60C 11/0083; B60C 11/01; B60C 11/04; B60C 11/12; B60C 2011/013
USPC ............. 152/209.14, 209.15, DIG. 3, 209.16, 152/209.25, 209.18
IPC ............................................. B60C 11/01, 11/00
See application file for complete search history.

(56) References Cited

U.S. PATENT DOCUMENTS

| | | | | |
|---|---|---|---|---|
| 4,756,352 A | * | 7/1988 | Ogawa et al. ............. | 152/209.14 |
| 6,167,932 B1 | * | 1/2001 | Yamamoto et al. ....... | 152/209.14 |
| 2011/0220259 A1 | * | 9/2011 | Suzuki et al. ............. | 152/209.18 |

FOREIGN PATENT DOCUMENTS

| | | | | | |
|---|---|---|---|---|---|
| JP | 10258612 A | * | 9/1998 | .............. | B60C 11/00 |
| JP | 2001018615 A | * | 1/2001 | .............. | B60C 11/00 |

(Continued)

OTHER PUBLICATIONS

Machine translation of JP 10-258612, 1998.*

(Continued)

*Primary Examiner* — Richard Crispino
*Assistant Examiner* — Philip N Schwartz
(74) *Attorney, Agent, or Firm* — Birch, Stewart, Kolasch & Birch, LLP (57) ABSTRACT

A heavy-load radial tire comprises a tread portion, wherein in a tire meridian section including a tire axis under a normally inflated unloaded condition in which the tire is mounted on a standard wheel rim and inflate to a standard pressure but loaded with no tire load, the tread portion comprises a crown portion and a pair of shoulder portions each disposed axially outside the crown portion and including a tread edge, the crown portion has a crown profile being a circular arc of a radius of curvature TR1 of which the center is on a tire equatorial plane, the shoulder portion has a shoulder profile being a circular arc of a radius of curvature TR2 which crosses the crown profile at an intersection point P so that a tangent line on the shoulder profile at the intersection point P inclines at angle of not more than 7 degrees with respect to a tire axial direction, wherein the radius of curvature TR2 is 0.60 to 0.95 times the radius of curvature TR1, a plurality of sipes are provided in the shoulder portion, and each sipe extends from the tread edge toward the tire equatorial plane without going beyond the shoulder portion.

8 Claims, 9 Drawing Sheets

(56) References Cited

FOREIGN PATENT DOCUMENTS

| JP | 2006-76359 A | | 3/2006 | |
| JP | 2009113543 A | * | 5/2009 | ............. B60C 11/00 |
| WO | WO 2010/058857 | * | 5/2010 | ............. B60C 11/00 |

OTHER PUBLICATIONS

Machine translation of JP 2009-113543, 2009.*

English Language Machine Translation of JP2001-018615, 2001.*

* cited by examiner

HEAVY-LOAD RADIAL TIRE

BACKGROUND OF THE INVENTION

1. Technical Field

The present invention relates to a heavy-load radial tire which can prevent uneven wear of a tread portion.

2. Related Art

Figure 8A:
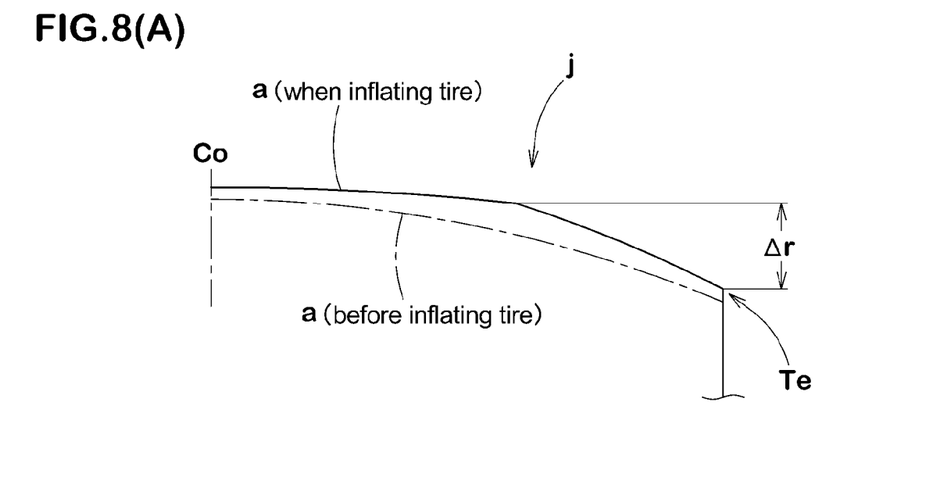
FIGS. 8(A) to 8(C) are diagrams each showing tread shoulder profile of a heavy-load radial tire.

FIG. 8(A) shows a profile of a tread surface (hereinafter, also referred to simply as "tread profile") "a" of a heavy load radial tire. As shown with a phantom line in FIG. 8(A), if high air pressure is charged into the heavy load radial tire having the tread profile formed from a single arc, there is a tendency that the tread surface a largely swells outward in a radial direction of the tire at a substantially intermediate position j between a tire equatorial plane Co and a tread edge Te. Hence, a tire radius is largely varied between the intermediate position j and the tread edge Te. As a result, uneven wear such as shoulder wear "m" (shown with a phantom line in FIG. 8(C)) in which the tread surface a on the side of the tread edge Te is worn at an early stage is easily generated due to slip with respect to a road surface.

Figure 8B:
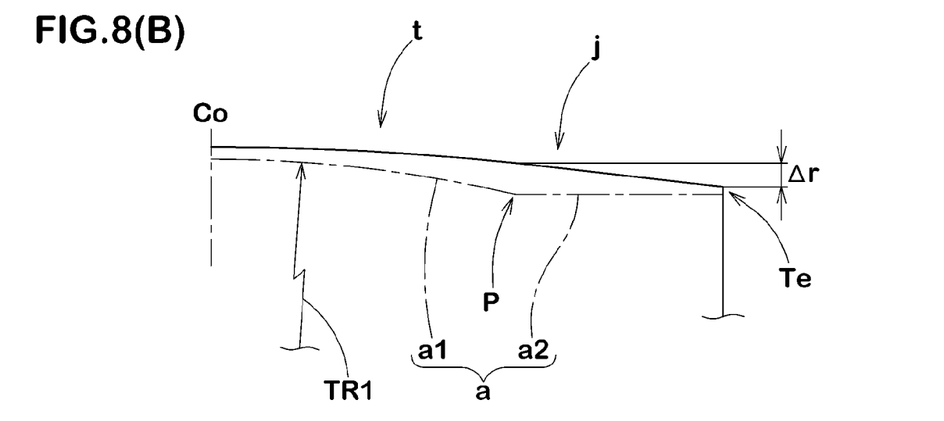
Figure 8C:
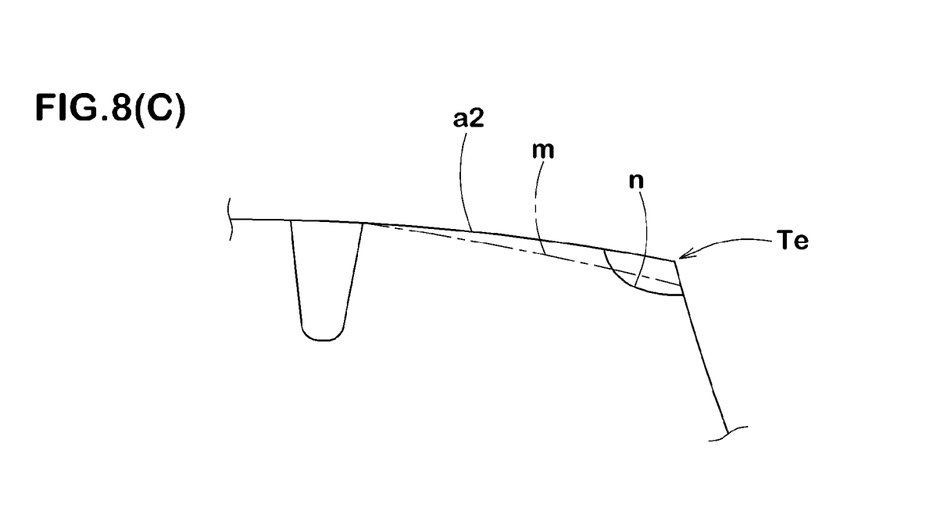

Japanese Patent Application Publication No. 2006-76359 teaches a tread surface in which to suppress the swelling when air pressure is charged, a tread profile at the time of vulcanizing molding is formed from a crown portion a1 of a radius of curvature TR1 having a center on a tire equatorial plane and a shoulder portion a2 which intersects with the crown portion a1 at an intersection point P and which is formed from a straight line extending in an axial direction of a tire, as shown with a phantom line in FIG. 8(B).

when high air pressure is charged into such a tire, the tread profile approaches a single arc, and a difference Δr between a tire radius of the intermediate position j and a tire radius of the tread edge Te becomes smaller than that shown in FIG. 8(A). Hence, slip between the tread surface and the road surface is suppressed from "start of ground contact" to "completion of ground contact" during running. However, on the tread surface in FIG. 8(B), ground contact pressure at the tread edge Te is increased, and the tread edge Te easily slips with respect to the road surface at the moment of the "completion of ground contact". As a result, as shown in FIG. 8(C), stepped wear n in which only a portion of the shoulder portion a2 in the vicinity of the tread edge Te is worn in a form of a step is easily generated in such a tread surface.

Figure 9:
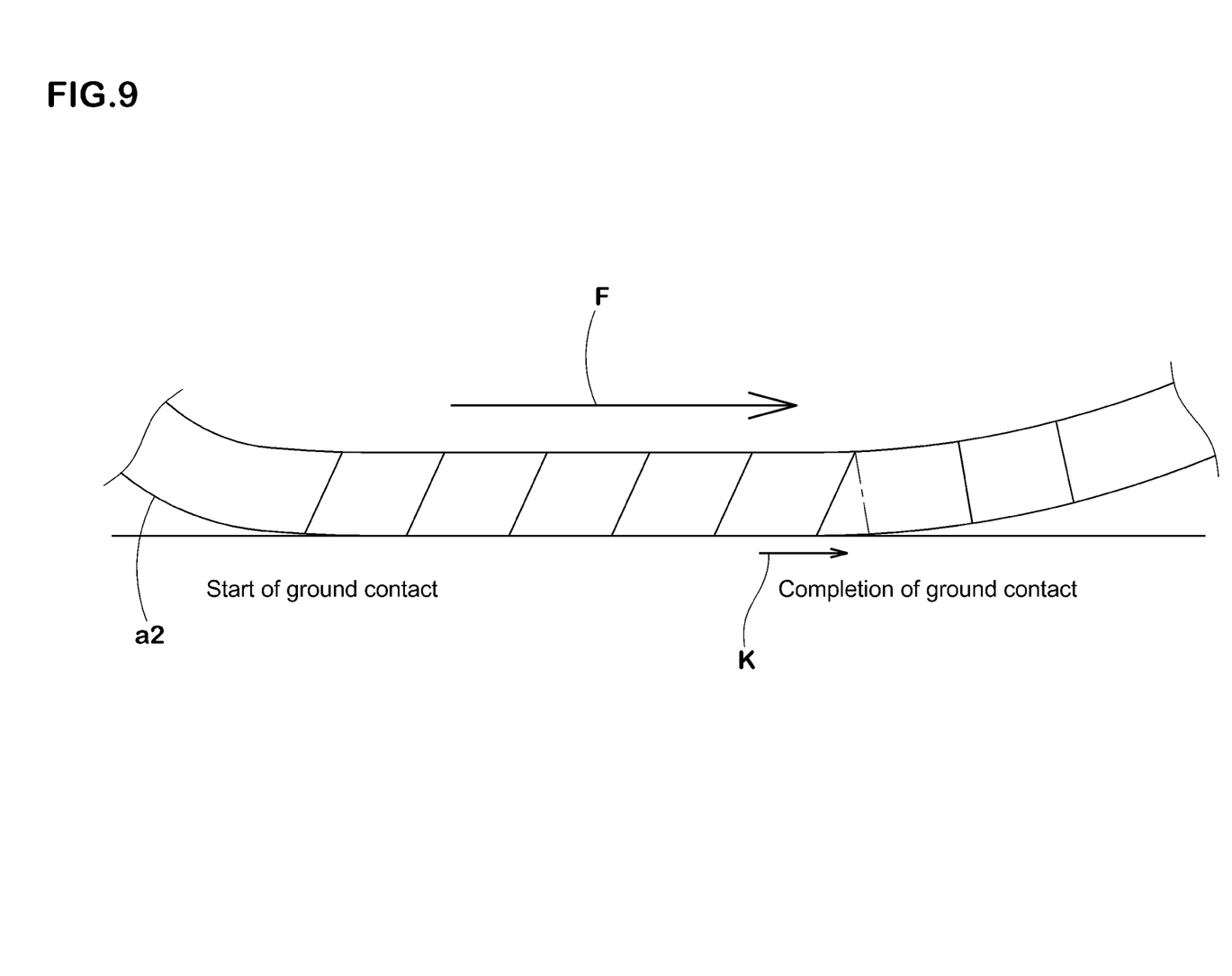
FIG. 9 is a diagram showing a ground contact state between a road surface and a shoulder portion of a tread portion of a tire.

FIG. 9 is a conceptual diagram showing a ground contact state between a road surface and a shoulder portion a2 of a tread portion. Generally, when the difference Δr between the tire radii is small and the ground contact pressure is high, shear deformation is generated in the shoulder portion a2 at the time of the "start of ground contact", and the motion proceeds toward the "completion of ground contact" while keeping the state where the shear deformation is generated. Since the ground contact pressure is abruptly lowered at the time of the "completion of ground contact", the sheared and deformed shoulder portion a2 tries to restore to its original shape. This instantaneously generates slip K in the same direction as a tire-rotating direction F between the shoulder portion a2 and the road surface. It is presumed that the stepped wear n is caused by this slip K.

The shoulder wear "m" is caused by the difference Δr between the tire radii, and is generated by the slip with respect to the road surface (slip K in the same direction as the tire-rotating direction F) which is continuously generated from the "start of ground contact" to the "completion of ground contact". Hence, the shoulder wear "m" is different from the stepped wear "n" in generation mechanism. The shoulder wear "m" occurs in the form of an inclined surface, and is different from the stepped wear "n" in the wearing shape.

SUMMARY OF THE INVENTION

An object of the present invention is to provide a heavy-load radial tire with improved wear resistance to have a long life by preventing step wear of the tread edge and/or shoulder wear.

A heavy-load radial tire according to the present invention, comprises a tread portion, wherein in a tire meridian section including a tire axis under a normally inflated unloaded condition in which the tire is mounted on a standard wheel rim and inflate to a standard pressure but loaded with no tire load, the tread portion comprises a crown portion and a pair of shoulder portions each disposed axially outside the crown portion and including a tread edge, the crown portion has a crown profile being a circular arc of a radius of curvature TR1 of which the center is on a tire equatorial plane, the shoulder portion has a shoulder profile being a circular arc of a radius of curvature TR2 which crosses the crown profile at an intersection point P so that a tangent line on the shoulder profile at the intersection point P inclines at angle of not more than 7 degrees with respect to a tire axial direction, wherein the radius of curvature TR2 is 0.60 to 0.95 times the radius of curvature TR1, a plurality of sipes are provided in the shoulder portion, and each sipe extends from the tread edge toward the tire equatorial plane without going beyond the shoulder portion.

In this description, the tread edges are the axial outermost edges of the ground contacting surface in the normally inflated loaded condition in which the tire is mounted on a standard wheel rim and inflate to a standard pressure and loaded with a standard tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/maximum-load Table or similar list. For example, the standard wheel rim is the "standard rim" specified in JATMA, the "measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like.

The standard load is the "maximum load capacity" in JATMA, the "Load Capacity" in ETRTO, the maximum value given in the above-mentioned table in TRA or the like.

Furthermore, in this description, the dimensions, sizes, positions and the like of the tire refer to those under the normally inflated unloaded condition unless otherwise noted.

According to such construction described above, it becomes possible to suppress both the shoulder wear and the stepped wear.

DETAILED DESCRIPTION OF THE PREFERRED EMBODIMENT

Figure 1:
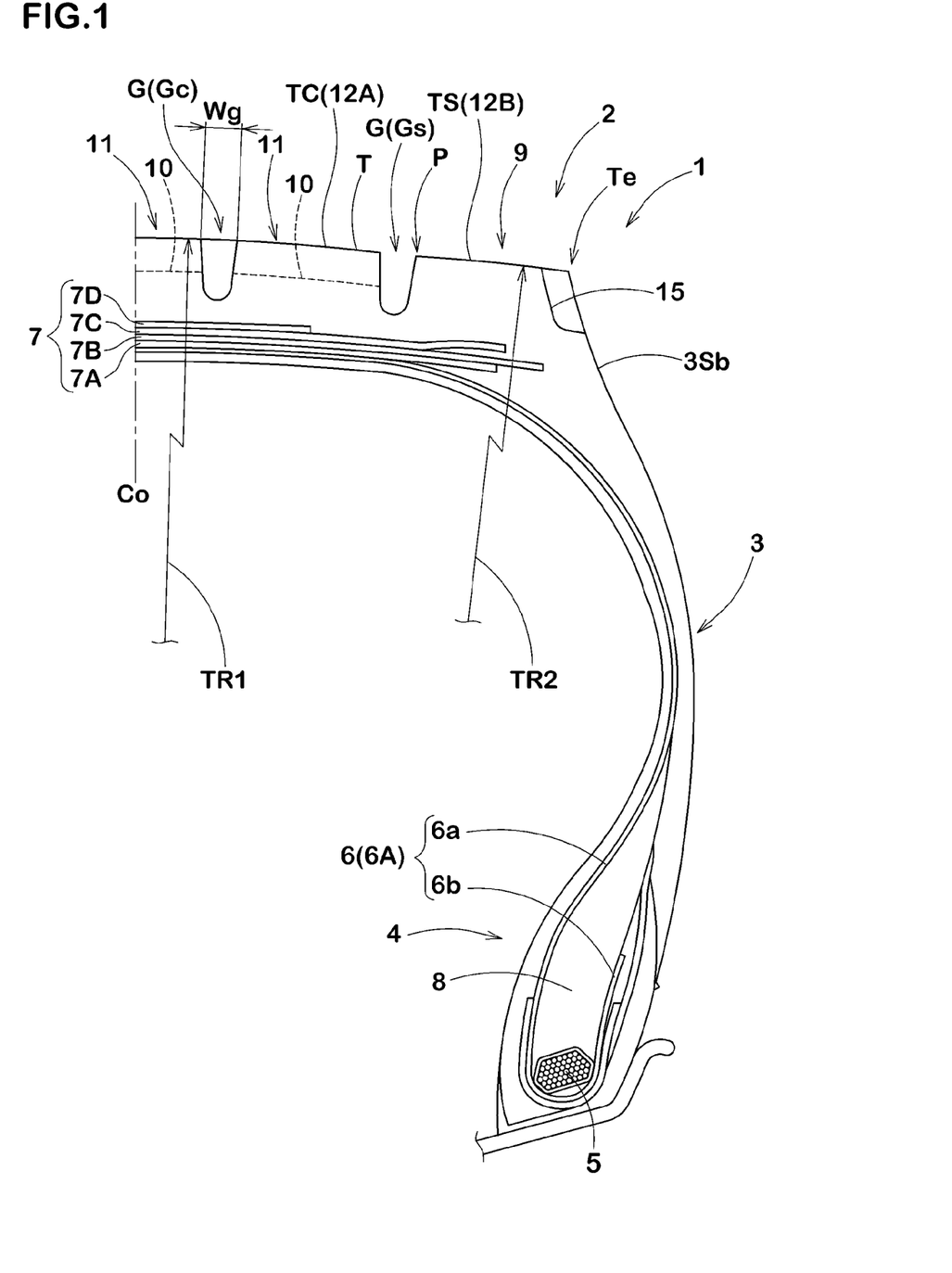
FIG. 1 is a cross sectional view showing an embodiment of the heavy-load radial tire of the present invention under the normally inflated unloaded condition.

An embodiment of the present invention will next be described with reference to the figures. FIG. 1 is a cross sectional view of a heavy-load radial type tire 1 of the present embodiment under a normally inflated unloaded condition. The tire 1 of the present embodiment comprises a tread portion 2, a pair of sidewall portions 3, a pair of bead portions 4 each with a bead core 5 therein, a toroidal carcass 6 extending from the tread portion 2 through the sidewall portions 3 to the bead core 5 of each bead portion 4, and a belt layer 7 disposed radially outside the carcass 6 in the tread portion 2.

In this embodiment, the carcass 6 is formed from a single carcass ply 6A with carcass cords being aligned at an angle for example of 70 to 90 degrees with respect to a circumferential direction of the tire. The carcass ply 6A employs steel cords as carcass cords. The carcass ply includes a toroidal main portion 6a extending between bead cores 5 and a pair of turnup portions 6b each turned up around the bead core 5 from the axially inside to the outside of the tire. Moreover, a bead apex rubber 8 is provided between the main portion 6a and the turnup portion 6b of the carcass ply 6A which extends radially outwards from the bead core 5 to a tapered shape.

The belt layer 7 made from at least two belt plies of steel cords is disposed on the radially outside the carcass 6 in the tread portion 2. The belt layer 7 of the present embodiment for example is a four-layer structure made up of an innermost belt ply 7A of belt cords aligned at an angle of approximately 60 degrees plus/minus 15 degrees with respect to the tire equator C, and belt plies 7B, 7C, and 7D aligned at a small angle of approximately 10 to 35 degrees with respect to the tire equator C.

Figure 2:
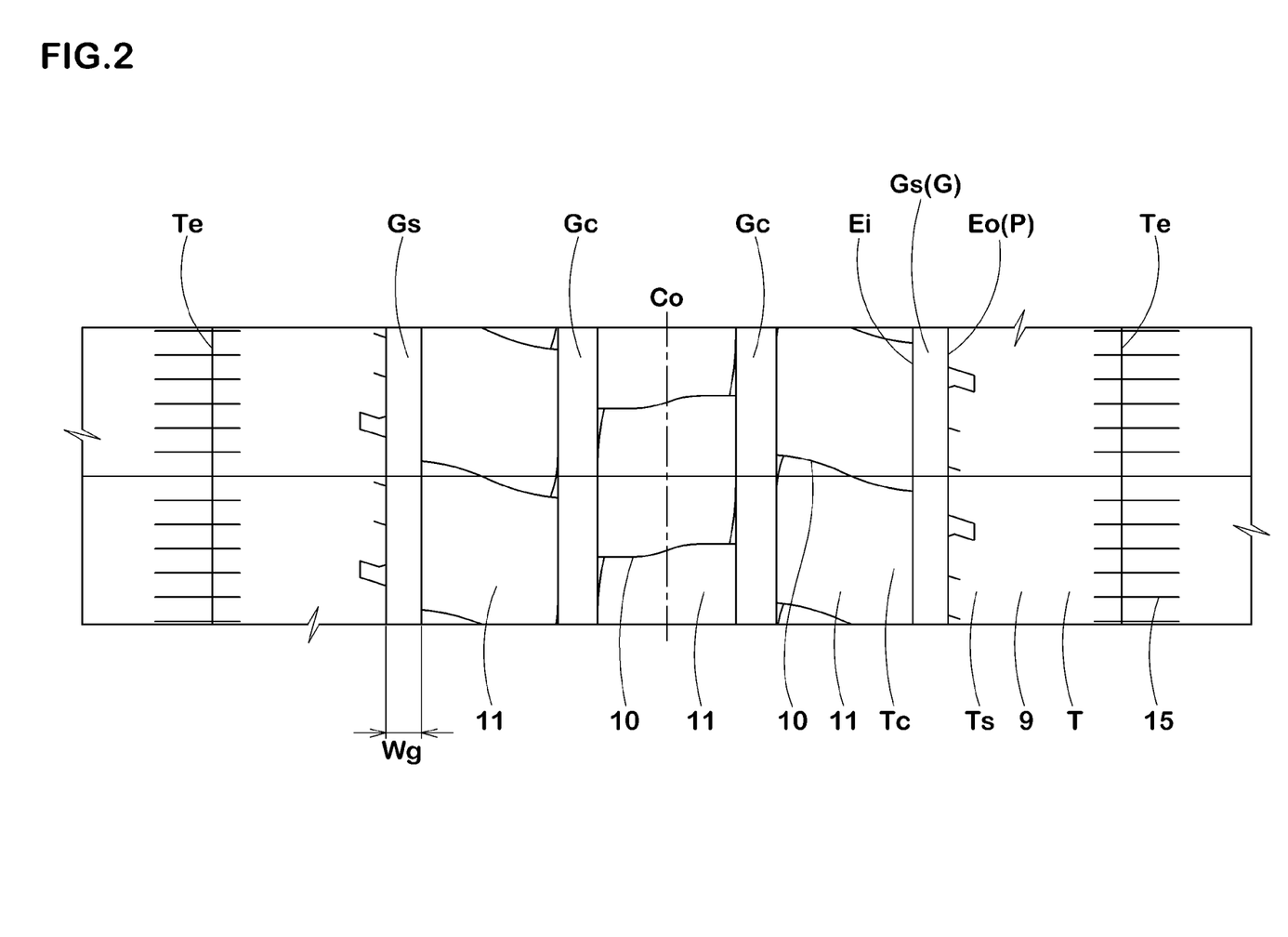
FIG. 2 is a developed view of the tread portion.

A plurality of longitudinal grooves G are provided in the tread portion 2 which continuously extend in the circumferential direction of the tire. Each longitudinal groove G has a wide width wg of at least 5 mm for improving drainage and wet grip performance. The longitudinal grooves include four grooves with a pair of shoulder grooves Gs which are arranged at the nearest side of the tread edge Te, and a pair of crown grooves Gc which are arranged between the shoulder grooves Gs. As shown in FIG. 2, the shoulder groove Gs, at least, is formed as a straight groove which has a pair of groove wall edges Ei and Eo extending straightly in the circumferential direction of the tire. Although the crown groove Gc is formed as a straight groove for preventing uneven wear in this embodiment, a zig-zag groove may be employed as the crown groove Gc.

An area of the tread portion between the tread edge Te and the shoulder groove Gs is formed as a rib which extends continuously in the tire circumferential direction. An area of the tread portion between the shoulder groove Gs and the crown groove Gc, and an area of the tread portion between the crown grooves Gc are formed as block rows 11 divided by sipes 10. However, these areas may be formed as ribs.

Figure 3:
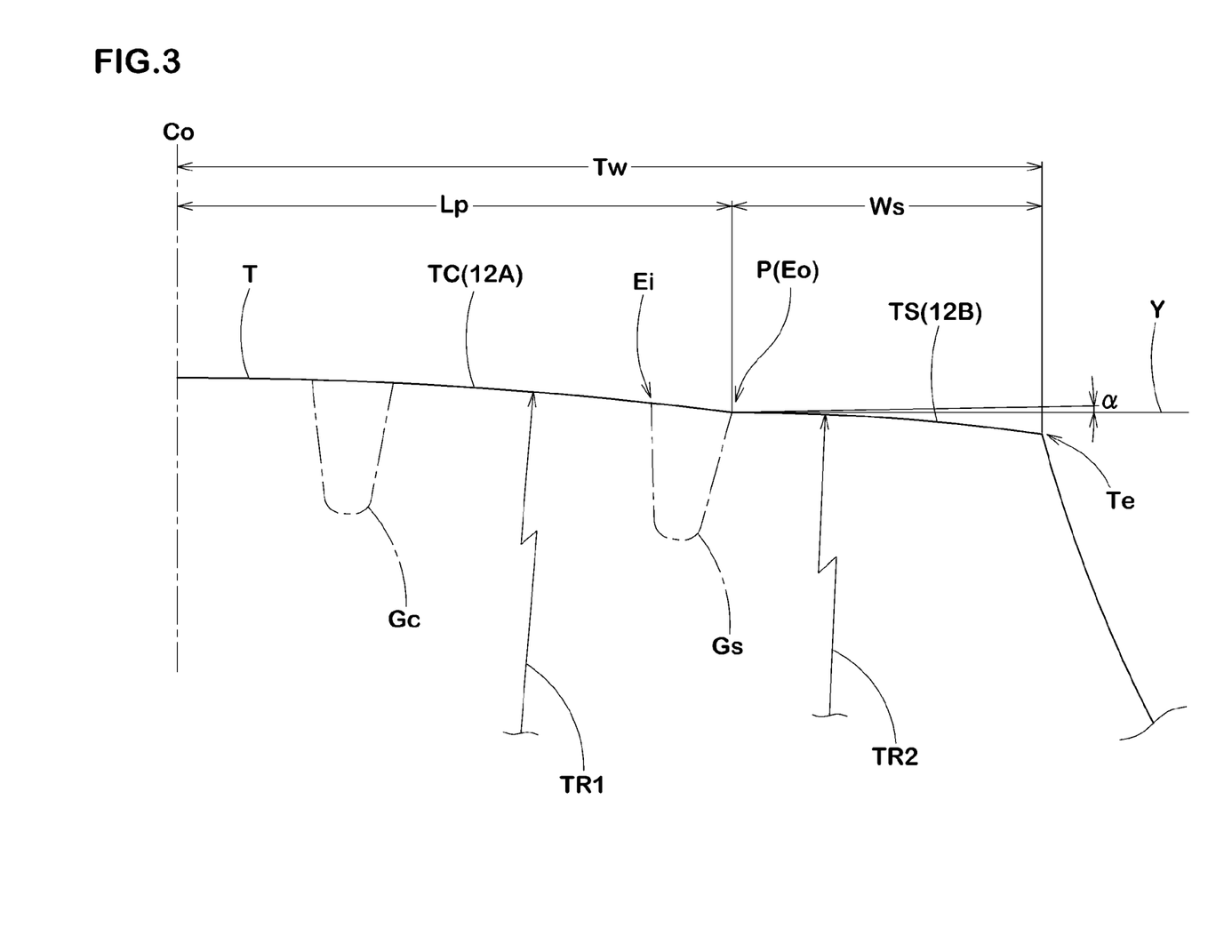
FIG. 3 is a diagram showing the tread profile of the tire.

In this embodiment, as shown in FIG. 3, in a tire meridian section under a normally inflated unloaded condition, the tread portion 2 has a tread profile T comprising a crown portion TC and a pair of shoulder portions TS each disposed axially outside the crown portion TC and including the tread edge Te. The crown portion TC has a crown profile 12A which is a circular arc of a radius of curvature TR1 of which the center is on the tire equatorial plane Co. The shoulder portion TS has a shoulder profile 12B which is a circular arc of a radius of curvature TR2 which crosses the crown profile 12A at an intersection point P. The radius of curvature TR1 is preferably set in a range of from 1.8 to 2.2 times of the tire nominal width.

The radius of curvature TR2 of the shoulder profile 12B is in a range of from 0.60 to 0.95 times of the radius of curvature TR1 of the crown profile 12A, and a tangent line Y on the shoulder profile 12B at the intersection point P inclines at angle alpha of not more than 7 degrees with respect to the tire axial direction. The angle alpha is shown as a plus angle when the tangent line Y inclines toward radially inside from the axially inside to the outside of the tire.

Further, the axially outer wall edge Eo of the shoulder groove Gs corresponds at the intersection point P. An axial distance Lp from the tire equatorial plane Co to the intersection point P is preferably set in a range of from 60% to 70% of the axial distance Tw from the tire equatorial plane Co to the tread edge Te.

Figure 4:
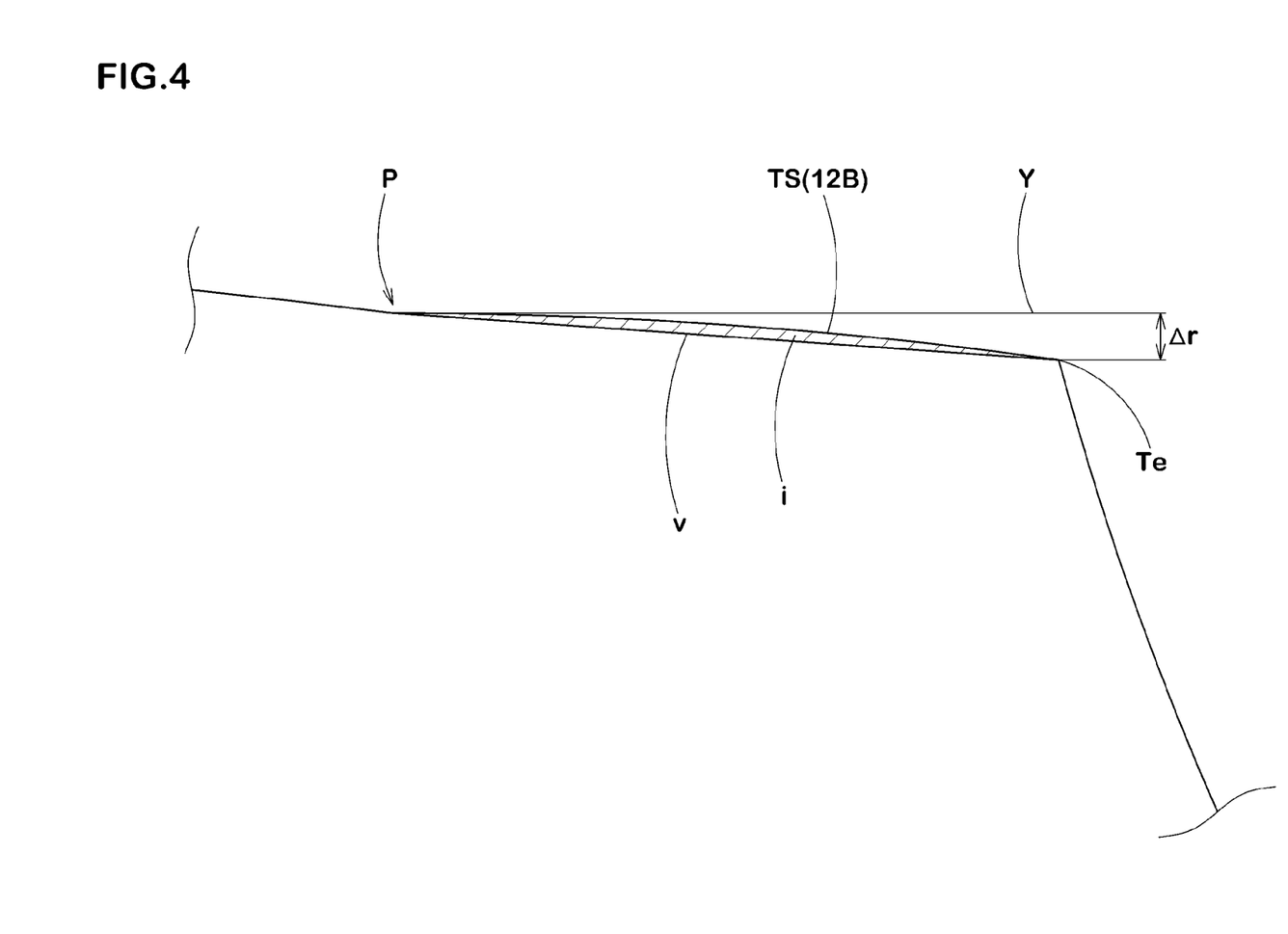
FIG. 4 is a diagram showing the shoulder portion of the tread portion.

As shown in FIG. 8(B), in the conventional tire (called comparative tire "t") in which a shoulder portion a2 is formed from a straight line substantially extending along the axial direction of the tire in the tread profile before inflating the tire, a portion of the tire in the vicinity of the intersection point P swells by charging standard pressure into the tire. However, also in this case, since the shoulder portion a2 of the comparative tire "t" is of the straight line, a load at the tread edge Te is large and the ground contact pressure at the tread edge Te becomes high due to the reduction in the difference Δr between the tire radii. On the other hand, since a shoulder profile 12B of this embodiment is of an arc as shown in FIG. 4, a load at a convex arc portion i which projects radially outward of a straight line v connecting the tread edge Te and the intersection point P is relatively increased. Therefore, even if the difference Δr between the tire radii is the same as that of the comparative tire "t", the load at the tread edge Te becomes relatively small. Therefore, according to the tire of the present invention, it is possible to improve the shoulder wear and to reduce the ground contact pressure at the tread edge Te.

If an angle alpha of the tangent line Y exceeds 7 degrees, the difference Δr between the tire radius of the tread edge Te and the tire radius of the intersection point P is increased, therefore the shoulder wear is easily generated. Also, when the radius of curvature TR2 is less than 0.6 times of the radius of curvature TR1, the difference Δr between the tire radius of the ground contact end Te and the tire radius of the intersection point P is increased and the shoulder wear is easily generated. If the radius of curvature TR2 exceeds 0.95 times of the radius of curvature TR1 on the other hand, the load at the convex arc portion i is reduced and the difference Δr between the tire radii becomes small, therefore the ground contact pressure at the ground contact end Te is increased and the stepped wear is easily generated.

when the distance Lp is less than 60% of the distance Tw, the difference Δr between the tire radii is increased and the shoulder wear is easily generated. If the distance Lp exceeds 70% of the distance Tw on the other hand, the ground contact pressure at the tread edge Te is increased and the stepped wear is easily generated.

Figure 5A:
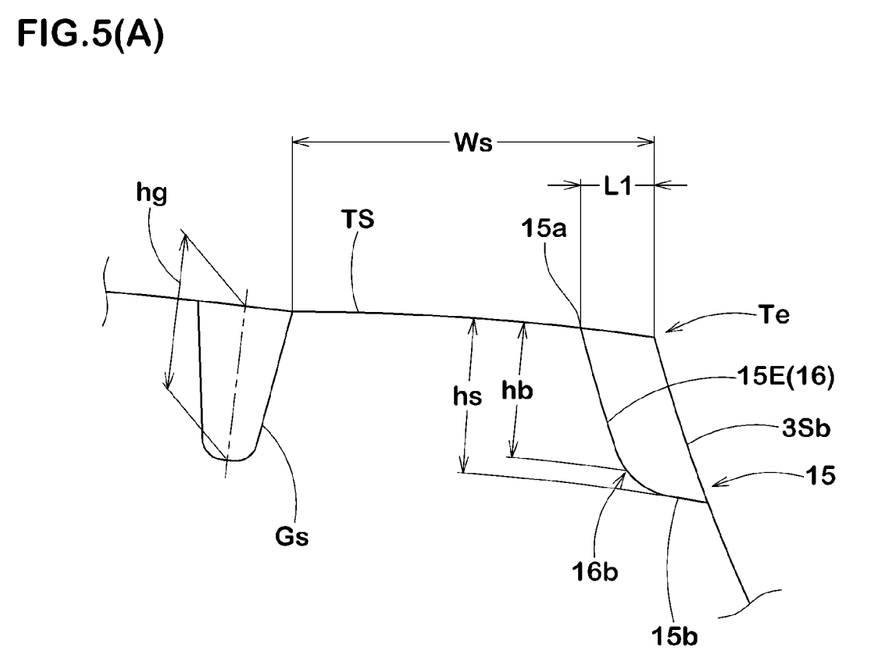
FIG. 5(A) is a cross sectional view of the shoulder portion.
Figure 5B:
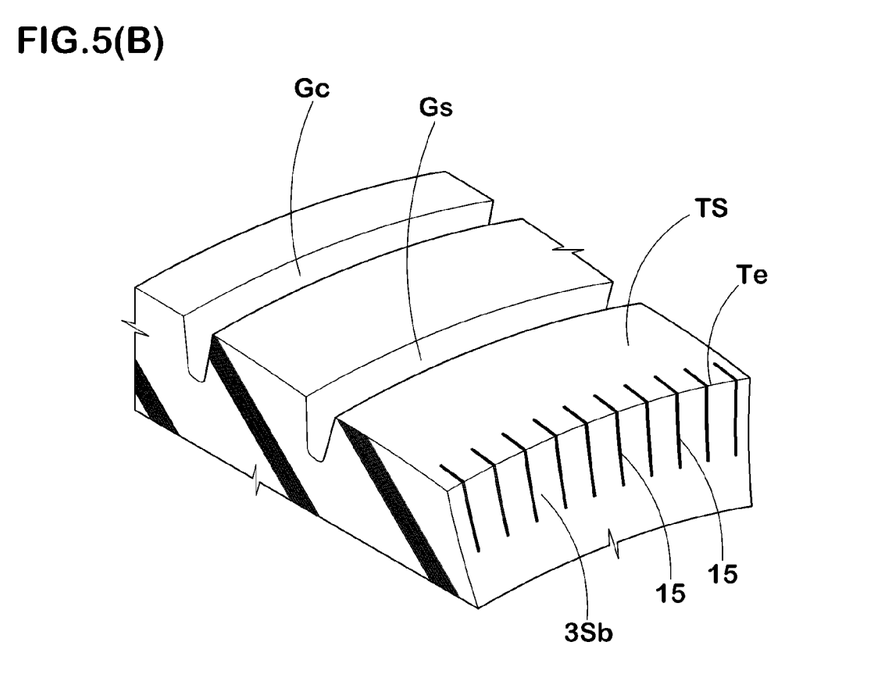
FIG. 5(B) is a perspective view of the shoulder portion.

According to a tire 1 of the embodiment, as shown in FIGS. 5(A) and (B), to further suppress the stepped wear, the shoulder portion TS is provided with a plurality of sipes 15 extending in the axial direction of the tire from the tread edge Te toward the tire equatorial plane Co. inner ends of each sipe 15 in the axial direction of the tire is terminated in the shoulder portion TS without going beyond the shoulder portion, and outer ends of each sipe 15 in the axial direction of the tire opens at a buttress surface 3Sb. The buttress surface 3Sb is a region of a tire outer surface in the vicinity of the tread edge Te which extends from the tread edge Te toward radially inward of the tire.

In this embodiment, a length L1 of each of the sipes 15 in the axial direction of the tire on an outer surface of the tread portion 2 is in a range of 0.05 to 0.10 times of a width Ws of the shoulder portion TS in the axial direction of the tire. A depth hs of the sipe from the tread profile T is in a range of 0.8 to 1.2 times of a depth hg of the shoulder groove Gs.

Figure 6:
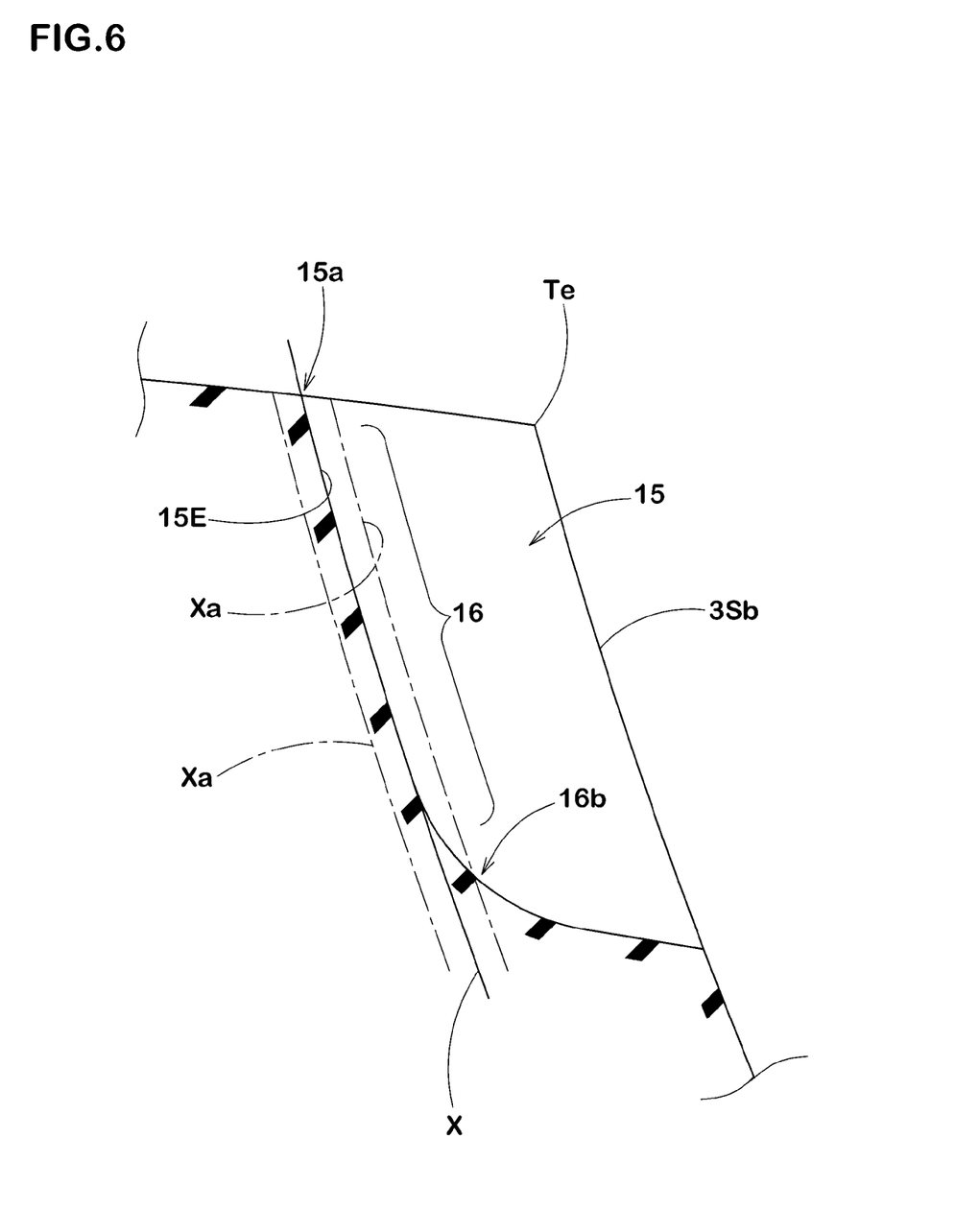
FIG. 6 is a cross sectional view showing a parallel portion of the shoulder portion.

The sipe 15 includes an axially inner end 15E which extends from a sipe inner end point 15a on an inner side in the axial direction of the tire on the tread profile T to a sipe bottom 15b. The sipe bottom 15b has a maximum depth of the sipe 15. Moreover, the inner end 15E of the sipe includes a parallel portion 16 which extends from the sipe inner end point 15a substantially in parallel to the buttress surface 3Sb of the tire. A depth hb of the parallel portion 16 from the outer surface of the tread portion 2 to a radially inner end 16b of the parallel portion 16 is 0.1 to 0.9 times of the sipe depth hs. The sipe depth hs is a maximum depth from the outer surface of the tread portion 2 to the sipe bottom 15b.

In FIG. 6, when a reference line which passes through the sipe inner end point 15a and is parallel to the buttress surface 3Sb is defined as X, and boundary lines which are separated from the reference line X on axially both sides by a distance of 0.5 mm are defined as Xa and Xa, the parallel region 16 is defined as a portion in which the inner edge 15E passes between the boundary lines Xa and Xa.

Figure 7A:
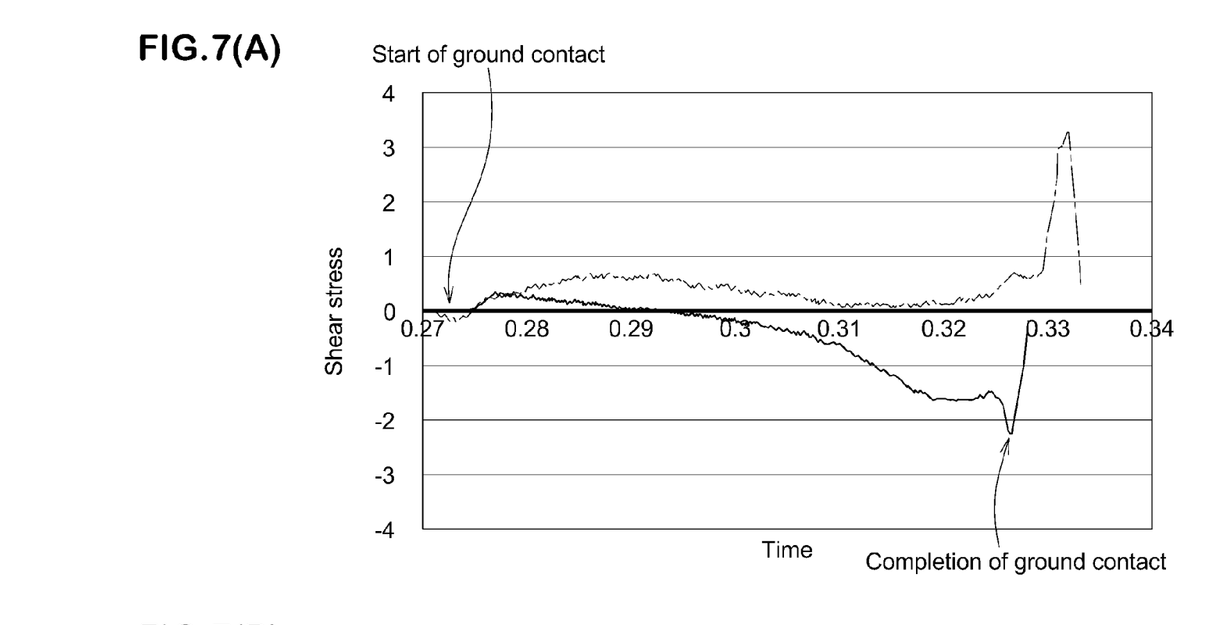
FIG. 7(A) is a graph showing a relation between time and shear stress generated in the shoulder portion when the tire comes into contact with the ground.
Figure 7B:
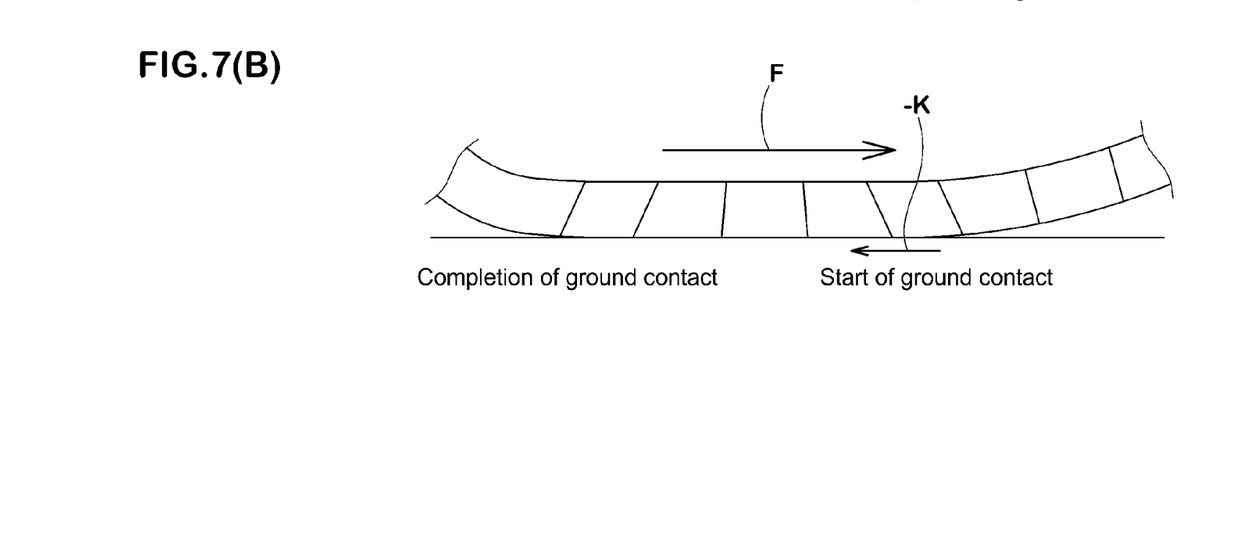
FIG. 7(B) is a cross sectional view of the shoulder portion of the tread portion taken along the tire circumferential direction.

The sipe 15 formed in this manner moderates shoulder rigidity on the side of the tread edge Te. Hence, as shown with the solid line in FIG. 7(A), when the shoulder portion TS comes into contact with the ground and the shear deformation is generated thereon, directions of shear stresses generated on the shoulder portion TS can become opposite from each other on the "start of ground contact" side and on the "completion of ground contact" side. That is, as shown in FIG. 7(B), orientations of the shear deformation in the shoulder portion TS become opposite from each other on the "start of ground contact" side and the "completion of ground contact" side. Hence, at the time of the "start of ground contact", the sheared and deformed shoulder portion TS in the opposite direction tries to restore to its original shape, and slip (−K) in a direction opposite from the tire-rotating direction F is generated between the tire and the road surface. The direction of the slip (−K) is opposite from that of the slip in the tire-rotating direction which is naturally generated when the tire rotates, these slips cancel each other and therefore, the slip (−K) becomes small. As a result, by synergistic interaction with the reducing effect of the ground contact pressure at the tread edge Te obtained by forming the shoulder portion TS into the arc shape, it is possible to suppress both the shoulder wear and the stepped wear.

To reliably obtain the above-described effect, it is preferable that the number N of sipes 15 formed in each of the shoulder portions TS is in a range of 15% to 22% of the numerical value of circumferential length (Unit:mm) on the tire equatorial plane Co of the tread portion T. If the number N of sipes 15 is less than this range, an interval between the sipes 15 is increased, the rigidity moderating effect becomes insufficient and the desired stepped wear-suppressing effect can not be exerted. If the number N exceeds this range on the other hand, the interval between the sipes 15 becomes small, rigidity becomes insufficient and rubber easily becomes chipped during running. From such a viewpoint, it is preferable that the number N of the sipes 15 is 17% or more and 20% or less of the circumferential length LL of the tire.

Similarly, when the length L1 of the sipe 15 is less than 0.05 times of the width Ws of the shoulder portion TS or when the sipe depth hs is less than 0.8 times of the depth hg of the shoulder groove Gs, the rigidity moderating effect is lowered and stepped wear is easily generated. When the length L1 is greater than 0.1 times of the width Ws of the shoulder portion TS or when the sipe depth hs is greater than 1.2 times of the depth hg of the shoulder groove Gs on the other hand, the rigidity of the shoulder portion becomes excessively small, a portion of the tire located between the sipes 15 largely moves in the circumferential direction and heel and toe wear is easily generated. Damage such as a crack is easily generated at the inner end point 15a or the inner edge 15E of the sipe 15. From such a viewpoint, it is preferable that the length L1 of the sipe 15 is 0.06 times or more and 0.08 times or less of the width Ws.

It is preferable that the depth hb of the parallel region 16 is 0.1 times or more, more preferably 0.5 times or more of the sipe depth hs. According to this, ground contact pressure of the tread edge Te and of a portion in the vicinity of the tread edge Te are uniformly reduced, and stepped wear is suppressed. When the depth hb exceeds 0.9 times of the sipe depth hs, stress is concentrated on a sipe bottom, and damage such as a crack is easily generated at the sipe bottom 15b.

A tread profile T in a state of normal internal pressure is controlled by a known technique such as a technique of adjusting a thickness of a tread portion 2 from a belt layer 7.

Although the especially preferred embodiment of the present invention has been described in detail above, the invention is not limited to the illustrated embodiment, and the invention can variously be deformed and carried out.

Comparative Test:

Heavy load radial tires (tire size is 12R22.5) of structure shown in FIG. 1 were prototyped in accordance with specifications shown in Table 1. Uneven wear resistances at shoulder portions of the prototyped tires were tested. Results thereof are shown in Table 1. Internal structures and tread patterns of the tires are substantially the same, and only tread profile shapes and sipes in the shoulder portions are different.

Common specifications of the tires are as follows:
Nominal tire width: 12 inches (=304.8 mm),
Ground contact half-width Tw: 100 mm,
Distance Lp: 0.6× Tw,
Tire circumferential length LL on tire equatorial plane: 336 mm,
Depth hg of shoulder groove: 15.0 mm, and
Depth hb of parallel region: 80% of sipe depth hs A test method is as follows:

Uneven Wear Resistance:

The prototyped tires were mounted around all of wheels of a truck (2-2·D type) having maximum load quantity of 10 t under conditions of rim (8.25×22.5) and internal pressure (800 kPa), and the truck was made to run on an ordinary road until a groove depth of the shoulder groove was worn by 30% at which the groove depth became 70% of that when it was new. Generation situations of shoulder wear, stepped wear, and chipped rubber caused by sipes in the shoulder portion after running were measured by visual inspection on a scale of one to five. The most excellent one of the tested tires in Table 1 was evaluated as five points, and the worst one of the tested tires was evaluate as one point.

was of two arcs as shown in FIG. 2 as in the comparative example 4, when the radius of curvature ratio TR2/TR1 was as excellent as 0.91, it was verified that shoulder wear was excellent but stepped wear was generated because there was no sipe. Even if sipes were formed in the tire of the comparative example 3 as in the comparative example 5, evaluation of uneven wear was the same as that of the comparative example 3. That is, it was verified that in a tire in which the ratio

TABLE 1

|  | Comparative example 1 FIG. 8(A) | Comparative example 2 FIG. 8(B) | Comparative example 3 FIG. 2 | Comparative example 4 FIG. 2 | Comparative example 5 FIG. 2 | Example 1 FIG. 2 | Example 2 FIG. 2 | Example 3 FIG. 2 | Comparative example 6 FIG. 2 |
|---|---|---|---|---|---|---|---|---|---|
| <Tread profile shape> | | | | | | | | | |
| Radius of curvature TR1 of Crown profile (mm) | 730 | 550 | 400 | 550 | 400 | 450 | 450 | 450 | 550 |
| Radius of curvature TR2 of shoulder profile (mm) | 730 | ∞ (straight line) | 200 | 500 | 200 | 270 | 400 | 430 | 550 |
| (Ratio TR2/TR1) | 1.00 | ∞ | 0.5 | 0.91 | 0.5 | 0.6 | 0.88 | 0.95 | 1.00 |
| Angle α of tangent line Y (°) | 8.7 | 0 | 0 | 0 | 0 | 0 | 0 | 0 | 0 |
| Tire radius at tread edge (mm) | 1052 | 1062 | 1053 | 1060 | 1053 | 1055 | 1057 | 1058 | 1060 |
| <Shoulder portion> | | | | | | | | | |
| Presence or absence of sipes | Absence | Absence | Absence | Absence | Presence | Presence | Presence | Presence | Presence |
| Number N of formed sipes | — | — | — | — | 600 | 600 | 600 | 600 | 600 |
| (Ratio/LL) | — | — | — | — | 0.18 | 0.18 | 0.18 | 0.18 | 0.18 |
| Depth hs of sipe (mm) | — | — | — | — | 11.5 | 11.5 | 11.5 | 11.5 | 11.5 |
| (Ratio hs/hg) | — | — | — | — | 0.8 | 0.8 | 0.8 | 0.8 | 0.8 |
| Length L1 of sipe (mm) | — | — | — | — | 2.5 | 2.5 | 2.5 | 2.5 | 2.5 |
| (Ratio L1/Ws) | — | — | — | — | 0.07 | 0.07 | 0.07 | 0.07 | 0.07 |
| Shoulder wear | 1 | 5 | 2 | 5 | 2 | 4 | 5 | 5 | 5 |
| Stepped wear | 5 | 1 | 5 | 3 | 5 | 5 | 5 | 4 | 3 |
| Chipped rubber | 5 | 5 | 5 | 5 | 5 | 5 | 5 | 5 | 5 |

|  | Example 4 FIG. 2 | Example 5 FIG. 2 | Example 6 FIG. 2 | Example 7 FIG. 2 | Example 8 FIG. 2 | Example 9 FIG. 2 | Example 10 FIG. 2 |
|---|---|---|---|---|---|---|---|
| <Tread profile shape> | | | | | | | |
| Radius of curvature TR1 of crown profile (mm) | 550 | 450 | 450 | 450 | 450 | 450 | 450 |
| Radius of curvature TR2 of shoulder profile (mm) | 500 | 400 | 400 | 400 | 400 | 400 | 400 |
| (Ratio TR2/TR1) | 0.91 | 0.88 | 0.88 | 0.88 | 0.88 | 0.88 | 0.88 |
| Angle α of tangent line Y (°) | 7 | 0 | 0 | 0 | 0 | 0 | 0 |
| Tire radius at ground contact end (mm) | 1054 | 1057 | 1057 | 1057 | 1057 | 1057 | 1057 |
| <Shoulder portion> | | | | | | | |
| Presence or absence of sipes | Presence | Presence | Presence | Presence | Presence | Presence | Presence |
| Number N of formed sipes | 600 | 1000 | 740 | 500 | 600 | 600 | 600 |
| (Ratio/LL) | 0.18 | 0.3 | 0.22 | 0.15 | 0.18 | 0.18 | 0.18 |
| Depth hs of sipe (mm) | 11.5 | 11.5 | 11.5 | 11.5 | 17.3 | 11.5 | 11.5 |
| (Ratio hs/hg) | 0.8 | 0.8 | 0.8 | 0.8 | 1.2 | 0.8 | 0.8 |
| Length L1 of sipe (mm) | 2.5 | 2.5 | 2.5 | 2.5 | 2.5 | 3.5 | 1.5 |
| (Ratio L1/Ws) | 0.07 | 0.07 | 0.07 | 0.07 | 0.07 | 0.1 | 0.05 |
| Shoulder wear | 4 | 5 | 5 | 5 | 5 | 5 | 5 |
| Stepped wear | 5 | 5 | 5 | 4 | 5 | 5 | 4 |
| Chipped rubber | 5 | 3 | 5 | 5 | 4 | 4 | 5 |

When a tread profile before inflating a tire was a single arc as shown in FIG. 8(A) as in the comparative example 1, it was verified that shoulder wear was large. When a shoulder portion of a tread profile before inflating a tire was of a straight line as shown in FIG. 8(B) as in the comparative example 2, it was verified that stepped wear was large. Even if a tread profile when inflating a tire was of two arcs as shown in FIG. 2 as in the comparative example 3, if the radius of curvature ratio TR2/TR1 is as small as 0.5, it was verified that stepped wear was excellent even if there was no sipe but shoulder wear was large. In a tire in which a tread profile when inflating a tire TR2/TR1 was lower than the lower limit value (0.6), sipes did not contribute to uneven wear.

In contrast, it was verified that in the example 1, since the ratio TR2/TR1 was as low as 0.6 (lower limit value), it was verified there was a tendency that shoulder wear was slightly generated. In the example 3, the ratio TR2/TR1 was as high as 0.95 (upper limit value) but it was verified that generation of the stepped wear was effectively suppressed by the effect of the sipes. In the comparative example 6, the ratio TR2/TR1 was 1.0 and exceeded the upper limit value (0.95) of the invention. Therefore, in the comparative example 6, it was verified that generation of the stepped wear could not sufficiently be suppressed even if sipes were formed. In the example 4, the ratio TR2/TR1 was 0.8 which was an appropriate value, but the angle α of the tangent line was as large as 7° (upper limit value) and there was a tendency that shoulder wear was slightly generated. In the example 5, a ratio N/LL of the number of formed sipes was 0.3 and exceeded the preferable upper limit value (0.22). Therefore, it was verified that rigidity between the sipes was insufficient and rubber became chipped slightly. In the example 6, since the ratio N/LL of the number of formed sipes was the upper limit value (0.22) or less, it was verified that the rigidity between the sipes was secured and rubber was prevented from becoming chipped. In the example 7, since the ratio N/LL of the number of formed sipes was as low as the lower limit value (0.15), the effect of the sipes was lowered and a generation tendency of stepped wear was confirmed. In the example 8, since the sipe depth was equal to the upper limit value (hs/hg=1.2), the rigidity between sipes was lowered, and a generation tendency of chipped rubber was confirmed. In the example 9, since the sipe length was equal to the upper limit value (L1/Ws=0.1), the rigidity between sipes was lowered, and a generation tendency of chipped rubber was confirmed. In the example 10, since the sipe length was equal to the lower limit value (L1/Ws=0.05), the effect of sipes was lowered, and a generation tendency of stepped wear was confirmed.

The invention claimed is:

1. A heavy-load radial tire comprising a tread portion in a tire meridian section including a tire axis under a normally inflated unloaded condition in which the tire is mounted on a standard wheel rim and inflated to a standard pressure but loaded with no tire load, the tread portion comprising a crown portion, and a pair of shoulder portions each disposed axially outside the crown portion, the crown portion having a crown profile being a circular arc of a radius of curvature TR1 of which the center is on a tire equatorial plane, the shoulder portion having a shoulder profile being a circular arc of a radius of curvature TR2, the shoulder profile extending so as to pass across the crown profile at an intersection point P so that the intersection point P dents inwardly of the tire and a tangent line on the shoulder profile at the intersection point P inclines at angle of not more than 7 degrees with respect to a tire axial direction, the shoulder profile extending to a tread edge, wherein the radius of curvature TR2 is 0.88 to 0.95 times the radius of curvature TR1, and the shoulder portion is provided with a plurality of sipes each of which extends from the tread edge toward the tire equatorial plane without going beyond the shoulder portion.

2. The heavy-load radial tire according to claim 1, wherein the number N of sipes in each shoulder portion is in a range of from 15% to 22% of a numerical value of circumferential length of a tire equator based on millimeters.

3. The heavy-load radial tire according to claim 1, wherein an axial distance Lp from the tire equatorial plane to the intersection point P is in a range of from 60% to 70% of an axial distance Tw from the tire equatorial plane to the tread edge.

4. The heavy-load radial tire according to claim 1, wherein the radius of curvature TR1 is 1.8 to 2.2 times of a tire nominal width.

5. The heavy-load radial tire according to claim 1, wherein the tread portion is provided with a shoulder groove extending in a circumferential direction of the tire at the nearest side of the tread edge, and the intersection point P is on an axially outer groove wall of the shoulder groove.

6. The heavy-load radial tire according to claim 1, wherein the sipe has an axial length L1 on an outer surface of the tread portion, and the length L1 is in a range of from 0.05 to 0.10 times of the axial width of the shoulder portion.

7. The heavy-load radial tire according to claim 5, wherein the sipe has a depth in a range of 0.8 to 1.2 times of the depth of the shoulder groove.

8. The heavy-load radial tire according to claim 1, wherein the tire has a buttress surface extending from the tread edge toward radially inside of the tire, the sipe has an axially inner end extending from an outer surface of the tread portion to the bottom of the sipe, the inner end of the sipe has a parallel portion which is substantially in parallel with the buttress surface, and a depth of the parallel portion from the outer surface of the tread portion is in a range of from 0.1 to 0.9 times of the depth of the sipe.

* * * * *